(12) United States Patent
Kipersztok et al.

(10) Patent No.: US 8,781,981 B1
(45) Date of Patent: Jul. 15, 2014

(54) DEVICES AND METHODS FOR USE IN FORECASTING TIME EVOLUTION OF STATES OF VARIABLES IN A DOMAIN

(75) Inventors: Oscar Kipersztok, Redmond, WA (US); Uri Nodelman, Baltimore, MD (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 13/405,757

(22) Filed: Feb. 27, 2012

(51) Int. Cl.
*G06N 5/00* (2006.01)
*G06N 5/04* (2006.01)
*G06N 7/00* (2006.01)

(52) U.S. Cl.
CPC .. *G06N 5/00* (2013.01); *G06N 5/04* (2013.01); *G06N 7/00* (2013.01)
USPC .............................................. 706/14; 706/45

(58) Field of Classification Search
CPC .............. G06N 5/00; G06N 5/04; G06N 7/00
USPC .................................................. 706/1, 14, 45
See application file for complete search history.

(56) References Cited

U.S. PATENT DOCUMENTS

| | | |
|---|---|---|
| 7,044,854 B2 | 5/2006 | Abecassis et al. |
| 7,720,779 B1 * | 5/2010 | Perry et al. ...................... 706/45 |
| 2007/0188501 A1 | 8/2007 | Yee et al. |
| 2009/0063373 A1 | 3/2009 | Howard et al. |
| 2010/0015579 A1 | 1/2010 | Schlabach |
| 2010/0257464 A1 | 10/2010 | Renner |
| 2011/0106723 A1 * | 5/2011 | Chipley et al. ................ 705/348 |

* cited by examiner

*Primary Examiner* — Alan Chen
(74) *Attorney, Agent, or Firm* — Armstrong Teasdale LLP

(57) ABSTRACT

Devices and methods for use in forecasting the state of one or more of a plurality of variables within a domain are provided. One example method includes determining, at a processor, a first probability curve indicative of a probability of a change-in-state of the first variable over a first interval, the first probability defining a first substantially continuous time trajectory, determining, at the processor, a second probability curve indicative of a probability of a change-instate of the second variable over a second interval, the second probability defining a second substantially continuous time trajectory, the first interval at least partially overlapping with the second interval, and displaying, at a display device, the first and second probability curves substantially in real time, thereby permitting a user to compare the relative probabilities of the change-in-state of at least one of the first and second variables.

19 Claims, 5 Drawing Sheets too is an exemplary data flow 100 through computing
DEVICES AND METHODS FOR USE IN FORECASTING TIME EVOLUTION OF STATES OF VARIABLES IN A DOMAIN

BACKGROUND

The field of the disclosure relates generally to time forecasting, and more particularly, to systems and methods for use in forecasting time evolution of the state of one or more of a plurality of variables within a domain.

Generally, regardless of the type or subject matter of a decision, decisions maybe subject to one or more variables, whose states may affect the decision. For example, a decision to mobilize troops in a battle space may be affected by multiple variables, such as, for example, weather, ground force locations, the duration of a troop movement, the level of troop resources (friendly or enemy) necessary to continue engagement, the location of reinforcements, air support, and/or any other variables that may affect the ability, readiness, and/or the decision to determine whether or not to mobilize troops within a battle space and to determine the chance of successful achievement of a mission objective. Such decisions become increasingly complex as the number of variables having multiple states affecting the decision is increased. The ability to accurately predict the evolution of the state of such variables in time to support decisions, while considering all available information, may be difficult if not impossible. In one or more known forecasting methods, one or more of the variables in the system are held constant, while only a single variable is predicted into the future at a discrete time.

However, determining which variables should be held constant may be difficult. Often multiple forecasts must be performed and compared before a decision can be made. However, because of the trial and nature of the predictions, the accuracy and usefulness of such predictions may be limited. Moreover, performing multiple predictions may be costly and/or time-consuming

BRIEF DESCRIPTION

In one aspect, a computer implemented method for use in forecasting the state of one or more of a plurality of variables within a domain is provided. The variables include a first variable and a second variable. The method includes determining, at a processor, a first probability curve indicative of a probability of a change-in-state of the first variable over a first interval, the first probability defining a first substantially continuous time trajectory, determining, at the processor, a second probability curve indicative of a probability of a change-instate of the second variable over a second interval, the second probability defining a second substantially continuous time trajectory, the first interval at least partially overlapping with the second interval, and displaying, at a display device, the first and second probability curves substantially in real time, thereby permitting a user to compare the relative probabilities of the change-in-state of at least one of the first and second variables.

In another aspect, a computing device for use in a system architecture having multiple components is provided. The computing device includes a memory configured to store a domain including at least one variable associated with each of the multiple components of the system architecture, a display device, and a processing device coupled to the memory device and the display device. The processor is configured to determine a first probability curve indicative of a probability of a change-in-state of a first variable over a first interval, the first probability defining a first substantially continuous time trajectory, determine a second probability curve indicative of a probability of a change-instate of a second variable over a second interval, the second probability defining a second substantially continuous time trajectory, the first interval at least partially overlapping with the second interval, and cause the display device to display the first and second probability curves substantially in real time, thereby permitting a user to compare the relative probabilities of the change-in-state of at least one of the first and second variables.

In yet another aspect, one or more non-transitory computer-readable storage media having computer-executable instructions embodiments thereon is disclosed. When executed by at least one processor, the computer-executable instructions cause the at least one processor to determine a first probability curve indicative of a probability of a change-in-state of a first variable over a first interval, the first probability defining a first substantially continuous time trajectory, determine a second probability curve indicative of a probability of a change-instate of a second variable over a second interval, the second probability defining a second substantially continuous time trajectory, the first interval at least partially overlapping with the second interval, and display, at a display device coupled to the at least one processor, the first and second probability curves substantially in real time, thereby permitting a user to compare the relative probabilities of the change-in-state of at least one of the first and second variables.

The features, functions, and advantages that have been discussed can be achieved independently in various embodiments or may be combined in yet other embodiments further details of which can be seen with reference to the following description and drawings.

DETAILED DESCRIPTION

The subject matter described herein relates generally to devices and methods for use in forecasting the state of one or more of a plurality of variables within a domain. In one embodiment, technical effects of the methods, systems, and computer-readable media described herein include at least one of: (a) determine a first probability curve indicative of a probability of a change-in-state of the first variable over a first interval, the first probability defining a first substantially continuous time trajectory, (b) determine a second probability curve indicative of a probability of a change-in-state of the second variable over a second interval, the second probability defining a second substantially continuous time trajectory, the first interval at least partially overlapping with the second interval, and (c) display, at a display device coupled to said at least one processor, the first and second probability curves substantially in real time, thereby permitting a user to compare the relative probabilities of the change-in-state of at least one of the first and second variables.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
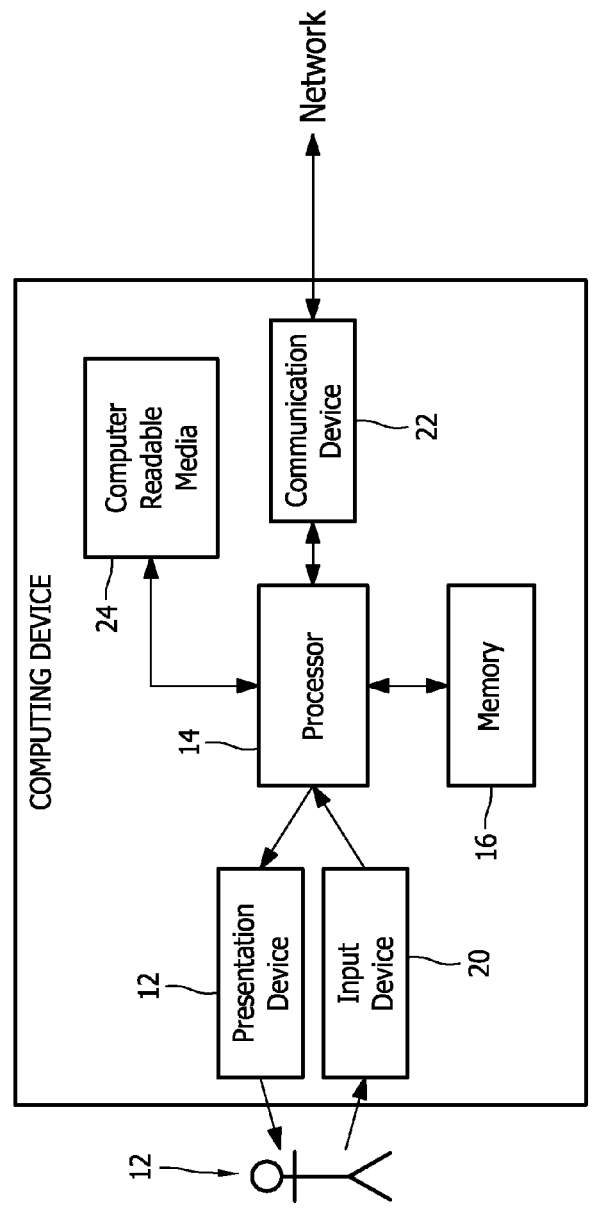
FIG. 1 is a block diagram of an exemplary computing device, that may be used in forecasting the state of one or more of a plurality of variables within a domain.

FIG. 1 is a block diagram of an exemplary computing device 10. In the exemplary embodiment, computing device 10 includes a memory 16 and a processor 14 that is coupled to memory 16 for executing programmed instructions. Processor 14 may include one or more processing units (e.g., in a multi-core configuration). Computing device 10 is programmable to perform one or more operations described herein by programming memory 16 and/or processor 14. For example, processor 14 may be programmed by encoding an operation as one or more executable instructions and providing the executable instructions in memory 16.

Processor 14 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 14, cause processor 14 to perform at least a portion of the methods described herein. The above examples are exemplary only, and thus are not intended to limit in any way the definition and/or meaning of the term processor.

Memory 16, as described herein, is one or more devices that enable information such as executable instructions and/or other data to be stored and retrieved. Memory 16 may include one or more computer-readable media, such as, without limitation, dynamic random access memory (DRAM), static random access memory (SRAM), a solid state disk, and/or a hard disk. Memory 16 may be configured to store, without limitation, maintenance event log, diagnostic entries, fault messages, and/or any other type of data suitable for use with the methods and systems described herein.

In the exemplary embodiment, computing device 10 includes a presentation interface 18 that is coupled to processor 14. Presentation interface 18 outputs (e.g., display, print, and/or otherwise output) information such as, but not limited to, installation data, configuration data, test data, error messages, and/or any other type of data to an operator 12. For example, presentation interface 18 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 18 includes more than one display device. In addition, or in the alternative, presentation interface 18 may include a printer.

In the exemplary embodiment, computing device 10 includes an input interface 20 that receives input from operator 12. In the exemplary embodiment, input interface 20 is coupled to processor 14 and may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 18 and as input interface 20.

In the exemplary embodiment, computing device 10 includes a communication interface 22 coupled to memory 16 and/or processor 14. Communication interface 22 is provided to receive various types of data and/or information from one or more sources. Communication interface 22 may be a single device or several devices, each dedicated to one or more different type of communications.

Instructions for operating systems and applications are located in a functional form on non-transitory memory 16 for execution by processor 14 to perform one or more of the processes described herein. These instructions in the different embodiments may be embodied on different physical or tangible computer-readable media, such as memory 16 or another memory, such as a computer-readable media 24, which may include, without limitation, a flash drive, CD-ROM, thumb drive, floppy disk, etc. Further, instructions are located in a functional form on non-transitory computer-readable media 24, which may include, without limitation, a flash drive, CD-ROM, thumb drive, floppy disk, etc. Computer-readable media 24 is selectively insertable and/or removable from computing device 10 to permit access and/or execution by processor 14. In one example, computer-readable media 26 includes an optical or magnetic disc that is inserted or placed into a CD/DVD drive or other device associated with memory 16 and/or processor 14. In some instances, computer-readable media 26 may not be removable.

Computing device 10 may be embodied in a variety of systems associated with forecasting time evolution of states of variables in a domain. In various embodiments, computing device 10 may be embodied in one or more portable communication devices, such as a smartphone, a tablet, a portable computer (e.g., an iPad), a laptop computer, a personal digital assistant (PDA), etc. In other embodiments, computing device 10 is an operation center workstation and/or server.

Figure 2:
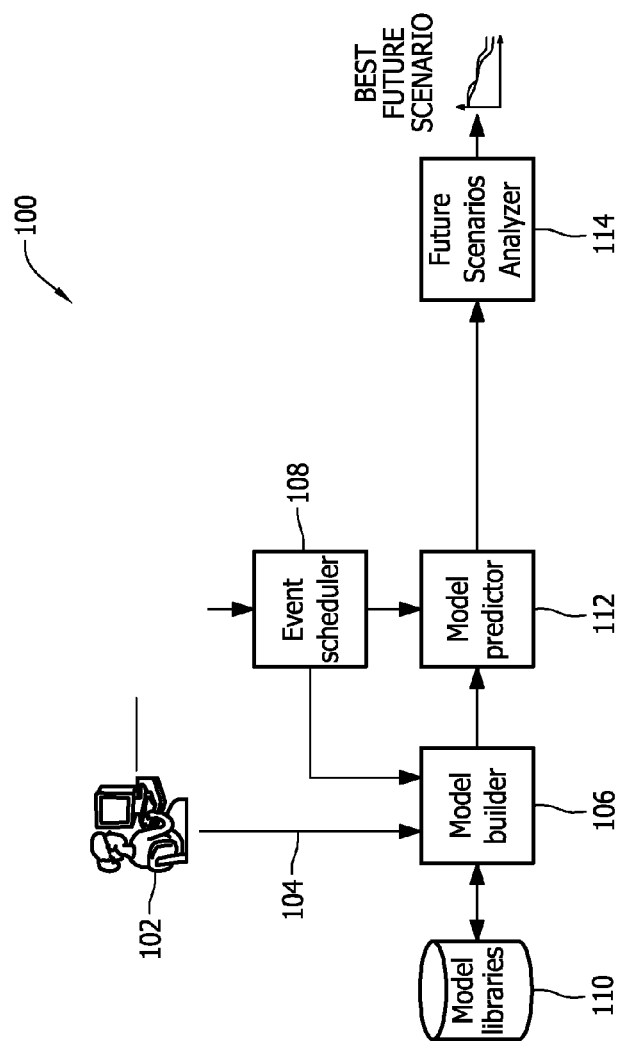
FIG. 2 is an exemplary data flow 100 through computing device 10, shown in FIG. 1.

FIG. 2 is an exemplary data flow 100 through computing device 10, shown in FIG. 1. In the exemplary embodiment, an analyst 102 or a team of analysts, who are Subject Matter Experts (SME) in a particular domain area design and build 104 a scenario that will be analyzed by computing device 10. In the exemplary embodiment, analyst 102 utilizes a model builder 106 that facilitates the design and build 104. In one embodiment, model builder 106 is a graphical user interface (GUI) that enables analyst 102 to input concepts and descriptions into model builder 106. Relations are also created between concepts and time constants are defined for each relationship. For example, in various embodiments, the GUI may receive from the analyst 102 assumptions, variables, relationships, decision points, predetermined thresholds for decision points, interdependence between variables, interdependence between assumptions, or interdependence between variables and assumptions of the model, as well as updates to the model.

An event scheduler 108, model libraries 110, and model predictor 112 are linked to model builder 106. Event scheduler 108 enables an analyst to define a schedule of events for each scenario and model libraries 110 represent a database where generic models are stored. Model predictor 112 utilizes algorithms to compute continuous time trajectories for variables under each scenario. For example, the continuous time trajectories may be based on continuous time Bayesian networks in one or more embodiments. In the exemplary embodiment, after a scenario has been computed by model predictor 112, a future scenarios analyzer 114 produces time trajectory graphs for any variable in each scenario for making comparisons between scenarios. In various embodiments, the model may further include identifying one or more decision points defined at a point where a curve of the time trajectory graph crosses a predetermined threshold.

For purposes of illustration, FIGS. 3-7 will exemplify data flow 100 through computing device 10. In the exemplary embodiment, an analyst designs 104 a scenario. In the designed scenario, the domain is a battle engagement situation where a friendly force engages in battle with an enemy force. The goal of the friendly force is to overpower the enemy force. In doing so, the friendly force will clear the way for another main force to pass through the area and be able to reach and seize a strategic location as the main objective.

Figure 3:
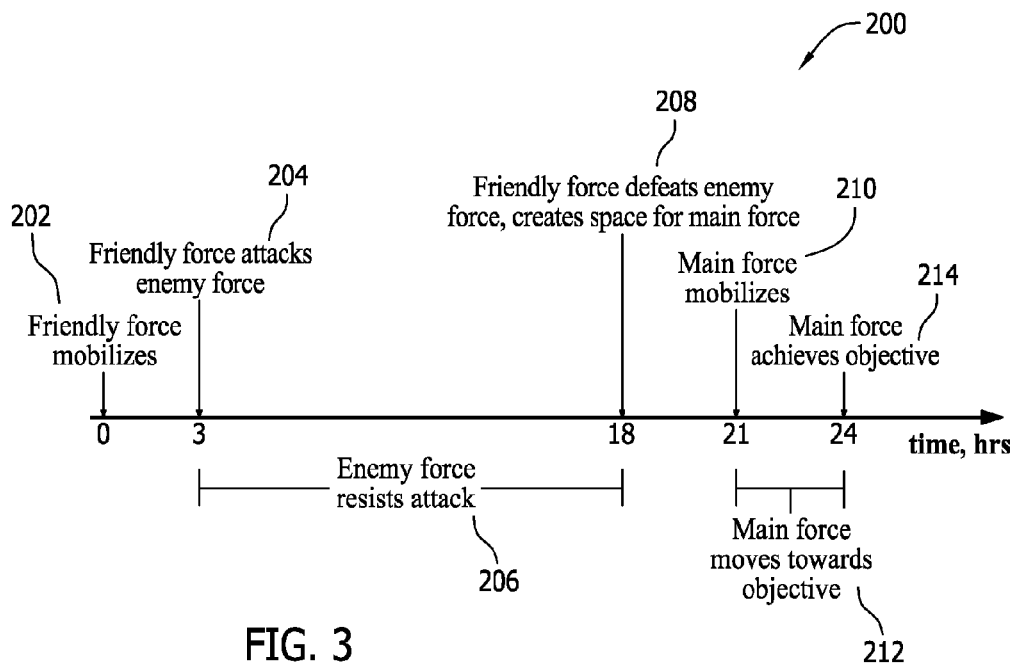
FIG. 3 represents an exemplary timeline 200 of data flow 200, shown in FIG. 2.

FIG. 3 represents an exemplary timeline 200 of data flow 200 shown in FIG. 2 created by event scheduler 108. In the exemplary embodiment, a friendly force mobilizes 202 at time 0. Three hours from mobilization 202, the friendly force attacks the enemy force 204. An enemy force resists attack from the friendly force 206 for 15 hours before the friendly force defeats the enemy force 208 after 18 hours. The main force then mobilizes 210 after 21 hours, moves towards the objective 212 for 3 hours, before achieving the objective 214 at hour 24.

In the exemplary embodiment, the relationships associated with the concepts determined by analyst 102 are depicted in FIG. 3. For example the 3 hours associated with the friendly force attacks enemy force concept represents the initial time of the model. The 15 hours from hour 3 to 18 represent the assumption that the friendly force will be able to defeat the enemy based on the current equipment, artillery, and resources, that each side is assumed to have and utilize.

Figure 4:
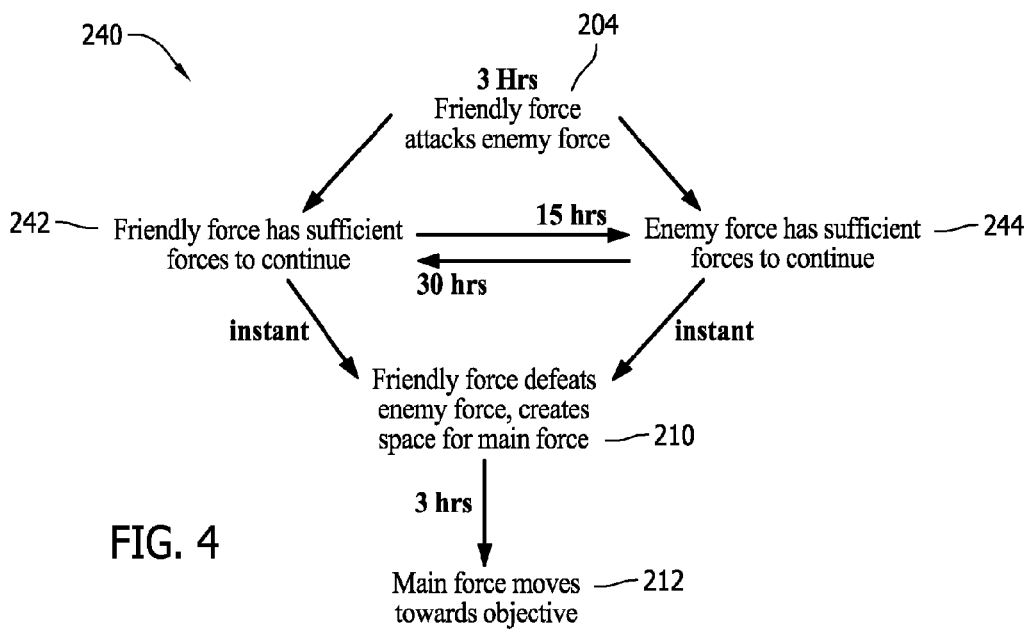
FIG. 4 represents an exemplary model 240 of data flow 200, shown in FIG. 2.

FIG. 4 represents an exemplary model 240 of data flow 200, shown in FIG. 2 created by model builder 106. In the exemplary embodiment, model 240 illustrates the concepts defined, which describe the variables of the scenario and their causal relations. Double arrows represent instantaneous effects, which is equivalent to zero time constant. Single arrows have time constants associated with them. For example, the 15 hours correspond to the expected time that it will take the friendly force with its current capability to engage the enemy in battle. Model 240 also illustrates the assumptions which are the times that are defined by the schedule of events and the time constants (15 and 30 hours). These time constants are shown for the feedback cycle between the friendly force has sufficient forces to continue 242 and the enemy force has sufficient forces to continue 244 variables. Variables 242 and 244 represent the necessary capabilities for the friendly and enemy forces to be able to stay engaged in battle. The 15 and 30 hours represent the equipment, artillery, and resources that each side is assumed to have to be able to engage with the other side.

Figure 5:
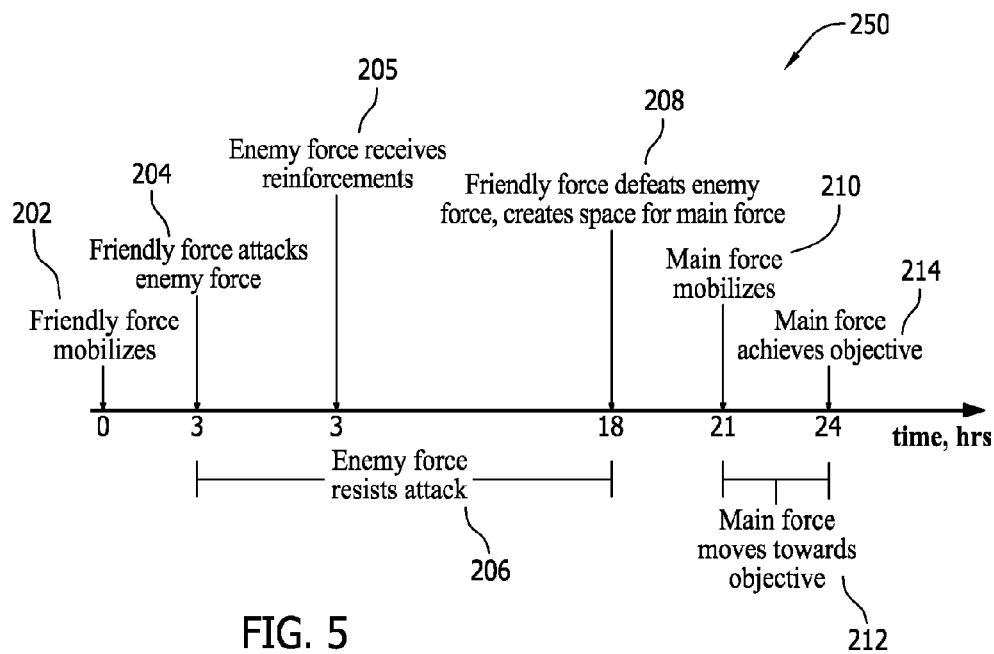
FIG. 5 depicts an exemplary timeline 250 of data flow 200 shown in FIG. 2.
Figure 6:
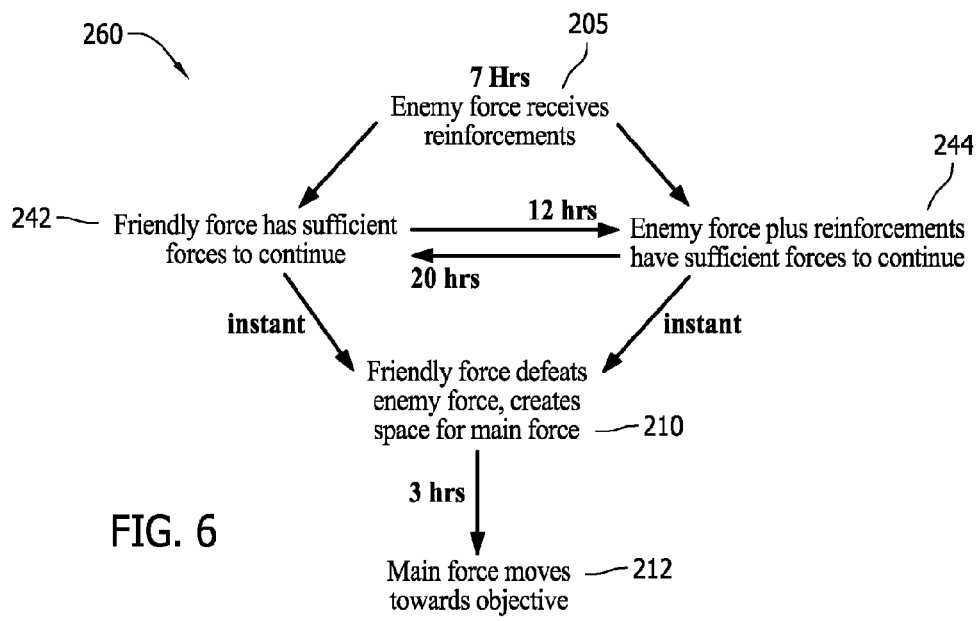
FIG. 6 represents an exemplary model 260 of data flow 200, shown in FIG. 2.

FIG. 5 depicts an exemplary timeline 250 of data flow 200 shown in FIG. 2 created by event scheduler 108 and FIG. 6 represents an exemplary model 260 of data flow 200, created by model builder 106. In the exemplary embodiment, an occurrence of an event may arise that affects the original forecasting in device 10. An occurrence of an event is depicted in FIGS. 5 and 6 making timeline 250 similar to timeline 200 with the addition of the enemy force receiving reinforcements 205 at hour 7. Model 260 reflects the addition of the enemy force receiving reinforcements 205. When a change occurs, device 10 re-determines models to account for a change in circumstances.

In the exemplary embodiment, based on the addition of reinforcements 205, the friendly force has now an expected 12 hours, instead of 15 hours shown in FIG. 4, to overcome the resistance of the enemy force. The enemy force also decreased its expected time to resist the friendly force from 30 to 20 hours. In the exemplary embodiment, these changes are results of SME assessment of the new balance of forces and expected attrition rates.

Figure 7:
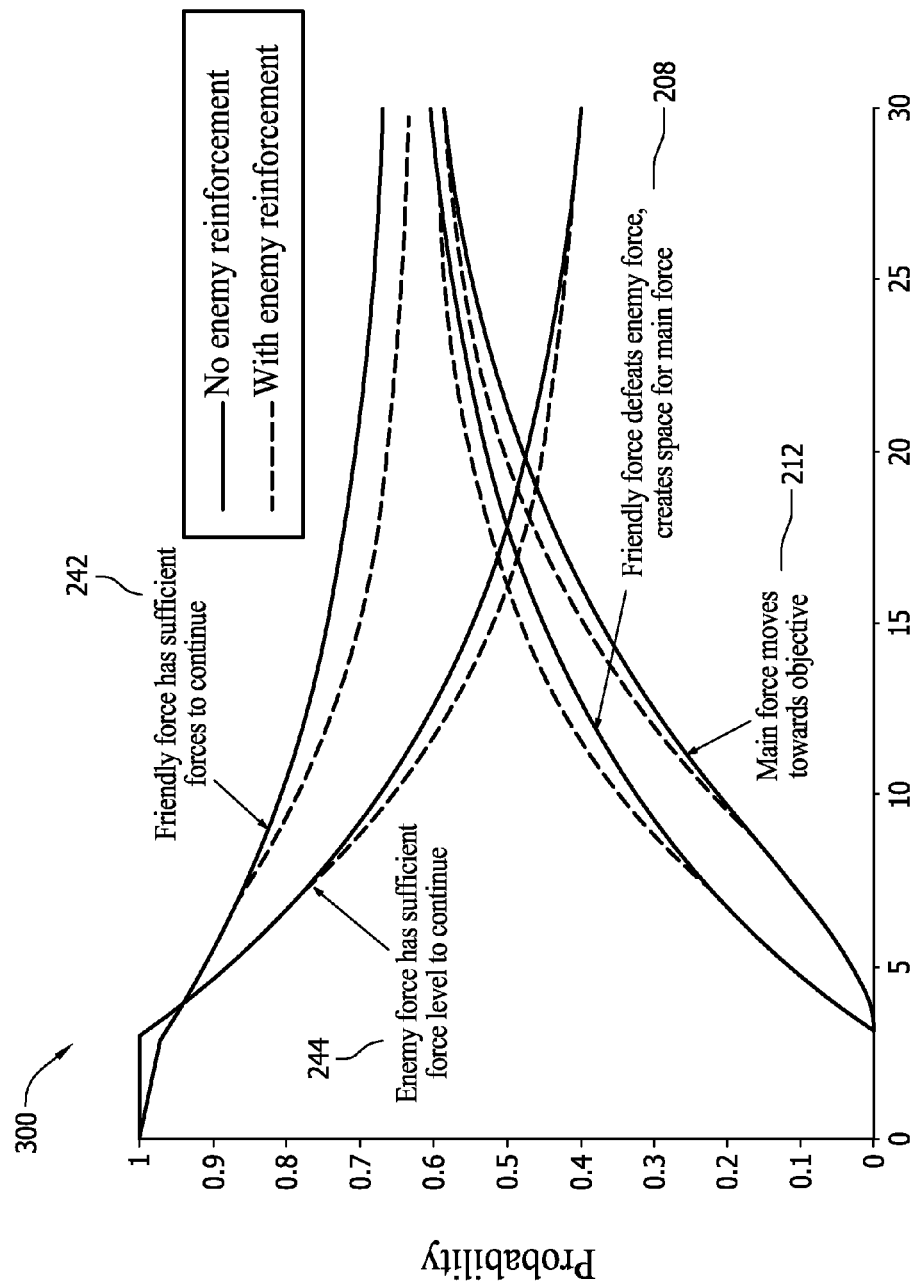
FIG. 7 represents a probability graph 300 of data flow 200, shown in FIG. 2.

FIG. 7 represents a probability graph 300 of data flow 200 shown in FIG. 2. In the exemplary embodiment, graph 300 depicts a percentage probability on the y-axis versus time (in hours) on the x-axis. Graph 300 illustrates the probability curve of variables 242 and 244, shown in FIGS. 4 and 6. Graph 300 also illustrates the probability curve of timeline events 208 and 212. In the exemplary embodiment, for each variable in graph 300 an altered probability curve is shown. For example, the probability that friendly force has sufficient force level to continue 242 decreases if enemy reinforcement is provided. The probability curves may be based on one or more assumptions associated with variables of the curves as exemplified in the examples above. Furthermore, when a change in one or more assumptions occur, or a change in relationship between variables or assumptions occur, or an event in the model occurs, the probability curves may be re-determined substantially in real time to account for a change in circumstances.

In the exemplary embodiment, graph 300 is output from computing device 10 to presentation interface 18. Alternatively, graph 300 can be output to memory 16 or transmitted to another computing device that is communicatively linked to computing device 10.

It should be appreciated that one or more aspects of the present disclosure transform a general-purpose computing device into a special-purpose computing device when configured to perform the functions, methods, and/or processes described herein.

The above-identified methods of forecasting are beneficial in that it models all variables in parallel instead of focusing on one variable while leaving the others out of the model. The methods described above also develop fully continuous trajectories instead of discrete approximations. Moreover, all variables are allowed to change over time, which enables modeling the interplay among the changing variables and, hence, better accuracy.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer implemented method for use in forecasting the state of one or more of a plurality of variables within a domain associated with a battle space, the plurality of variables including a first variable and a second variable, said method comprising:

determining, at a processor, a first probability curve indicative of a probability of a change-in-state of the first variable over a first interval, the first probability defining a first substantially continuous time trajectory;

determining, at the processor, a second time-dependent probability curve indicative of a probability of a change-instate of the second variable over a second interval, the second probability defining a second substantially continuous time trajectory, the first interval at least partially overlapping with the second interval; and displaying, at a display device, the first and second probability curves substantially in real time, thereby permitting a user to compare the relative probabilities of the change-in-state of at least one of the first and second variables.

2. The method of claim 1, wherein the first and second substantially continuous time trajectories are based on continuous time Bayesian networks.

3. The method of claim 1, wherein the first probability curve is based on at least one assumption associated with the first variables as defined by the user.

4. The method of claim 3, further comprising re-determining the first probability curve based on a user-defined change in the at least one assumption associated with the first variables.

5. The method of claim 1, further comprising re-determining the first probability curve in response to an occurrence of an event within the battle space.

6. The method of claim 1, further comprising receiving, at a user interface, an alteration to an interdependence between the first and second variables from the user; and re-determining at least the first probability curve indicative of the probability of the change-in-state of the first variable over the first interval based on the altered interdependence between the first and second variables.

7. The method of claim 1, further comprising identifying a decision point within the first interval, the decision point defined at the point in which the first probability curve crosses a predetermined threshold.

8. The method of claim 7, further comprising receiving, at a user interface, the predetermined threshold from the user.

9. A computing device for use in a system architecture having multiple components, said computing device comprising:

a memory configured to store a domain associated with a battle space including at least one variable associated with each of the multiple components of the system architecture;

a display device; and a processing device coupled to said memory device and said display device, said processor configured to:

determine a first probability curve indicative of a probability of a change-in-state of a first variable over a first interval, the first probability defining a first substantially continuous time trajectory;

determine a second probability curve indicative of a probability of a change-instate of a second variable over a second interval, the second probability defining a second substantially continuous time trajectory, the first interval at least partially overlapping with the second interval; and cause the display device to display the first and second probability curves substantially in real time, thereby permitting a user to compare the relative probabilities of the change-in-state of at least one of the first and second variables.

10. The computing device of claim 9, wherein said processor is further configured to re-determine the first probability curve in response to an occurrence of an event within the battle space.

11. The computing device of claim 9, further comprising a user interface coupled to said processor and configured to receive an alteration to an interdependence between the first and second variables from a user wherein said processor is further configured to re-determine at least the first probability curve indicative of the probability of the change-in-state of the first variable over the first interval based on the altered interdependence between the first and second variables.

12. The computing device of claim 9, wherein the first and second substantially continuous time trajectories are defined as continuous time Bayesian networks.

13. The computing device of claim 9, wherein the processor is configured to visually distinguish a predetermined threshold relative to the first probability curve.

14. The computing device of claim 9, wherein the processing device comprises at least one of a handheld computing device and a tablet computer.

15. One or more non-transitory computer-readable storage media having computer-executable instructions embodied thereon, wherein when executed by at least one processor, said computer-executable instructions cause the at least one processor to:

determine a first probability curve indicative of a probability of a change-in-state of a first variable over a first interval, the first probability defining a first substantially continuous time trajectory, wherein the first variable is within a domain associated with a battle space;

determine a second probability curve indicative of a probability of a change-instate of a second variable over a second interval, the second probability defining a second substantially continuous time trajectory, the first interval at least partially overlapping with the second interval, wherein the second variable is within the domain associated with the battle space; and display, at a display device coupled to said at least one processor, the first and second probability curves substantially in real time, thereby permitting a user to compare the relative probabilities of the change-in-state of at least one of the first and second variables.

16. The non-transitory computer-readable storage media of claim 15, wherein the computer-executable instruction further cause the processor to alter an interdependence between the first and second variables based on at least one input from the user.

17. The non-transitory computer-readable storage media of claim 16, wherein the computer-executable instruction further cause the processor to identify a decision point within the first interval, the decision point defined at the point in which the first probability curve crosses a predetermined threshold.

18. The non-transitory computer-readable storage media of claim 16, wherein the first and second substantially continuous time trajectories are based on continuous time Bayesian networks.

19. The non-transitory computer-readable storage media of claim 15, wherein the computer-executable instruction further cause the processor to re-determine the first probability curve based on a user-defined change in the at least one assumption associated with the first variables.

* * * * *